Figure 1:
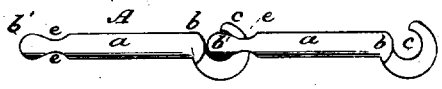

W. D. EWART,

Assignor to EWART MANUFACTURING CO.

Drive Chain.

No. 9,256. Reissued June 15, 1880.

*Witnesses:*

E. Wolff.

Jacob Felbel

*Inventor:*

William D. Ewart by attorney

J. N. McPhetre

N. PETERS, PHOTO-LITHOGRAPHER, WASHINGTON, D. C.

UNITED STATES PATENT OFFICE.

WILLIAM D. EWART, OF BELLE PLAINE, IOWA, ASSIGNOR TO EWART MANUFACTURING COMPANY, OF CHICAGO, ILLINOIS.

DRIVE-CHAIN.

SPECIFICATION forming part of Reissued Letters Patent No. 9,256, dated June 15, 1880.

Original No. 154,594, dated September 1, 1874. Reissue No. 6,387, dated April 20, 1875. Application for reissue filed April 26, 1879.

*To all whom it may concern:*

Be it known that I, WILLIAM D. EWART, of Belle Plaine, in the county of Benton and State of Iowa, have invented a new and useful Improvement in Drive-Chains; and I do hereby declare the following to be a full, clear, and exact description thereof, reference being had to the annexed drawings, making a part of this specification, and to the letters and figures of reference marked thereon.

My invention relates to that kind of chain which is composed of articulated open links adapted to engage with the projections of the sprocket-wheels, in connection with which such chains are commonly employed on harvesting and other machinery; and has for its main object to provide for use a chain of this class, of such construction that, while the articulated parts shall not be liable to accidental disengagement, any two of them may be purposely uncoupled and reunited by simply turning them into an unusual relative position, in order that the chain may be, at pleasure, either lengthened by the addition of one or more pieces, or shortened by the removal of one or more parts, for purposes well known.

A further object of my invention is the production of such a drive-chain under conditions of form and structure which, while conducive to economy in the manufacture of and strength and durability in the completed article, shall render it most convenient and desirable to the user.

To these ends and objects, principally, my invention consists, primarily, in a drive-chain, the articulations of which are such that while the parts may by design be readily detached for either legthening or shortening the chain by the addition or removal of parts thereof, or for any other purpose, the articulated parts composing the chain shall not be liable to casual or accidental detachment; and my invention consists, secondarily, in drive-chain links for forming a chain composed of duplicate parts, adapted to perform the usual functions of such links, and constructed so that each end of each link shall be adapted to engage with the opposite end of its duplicate in a manner which will permit the ready detachment of the parts for the purposes already explained, and at the same time not render the parts liable to accidental detachment.

To enable those skilled in the art to fully understand and practice my invention, I will proceed to more fully describe the manner in which I have practiced the same, referring by letters to the accompanying drawings, in which—

Figure 2:
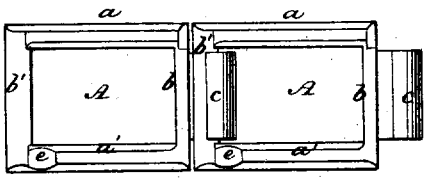
Figure 3:
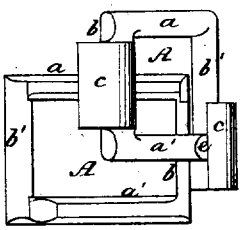

Figure 1 is an edge view of a drive-chain embracing my invention. Fig. 2 is a plan or face view of the same; Fig. 3, a similar view, but with one of the links turned over toward the other, and Fig. 4 a longitudinal central section, with the parts in the relative position seen at Fig. 3.

In the several figures the same part will be found designated by the same letter of reference.

The links A are preferably of a rectangular form, longer than they are broad, their side bars, *a a'*, being round, or nearly so, and their end bars, *b b'*, being constructed as shown in the annexed drawings.

Figure 4:
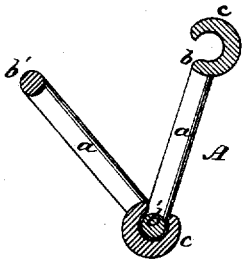

The end bar *b* of each link is provided with a broad hook, *c*, which is adapted to receive and accommodate the end bar *b'* of the next adjacent link when the links are coupled together, as shown at Fig. 1, and for the purposes of readily connecting and disconnecting the parts the side bar *a'* of each link is notched or reduced, as shown at *e*, so that when any two links are placed and held at an angle, as represented at Figs. 3 and 4, they can be hooked or coupled together, and unhooked or uncoupled, at pleasure.

When the links are coupled the hook-like portion *c* of one link is accommodated endwise between the side bars, *a a'*, of another link, as best seen at Fig. 2, and thus, when in a working condition, the links mutually retain each other in line laterally of the chain.

It will be understood that no detachment or separation of the parts at the points of articulation can occur except when two adjacent parts are turned over toward each other and at an angle to each other about as shown at Figs. 3 and 4, which is not only an unusual position of the parts, but one which cannot possibly occur when a drive-chain is in actual operation, no matter how slack it may be run; and it will be seen that, even when placed in these unusual and precise relative positions, the end bar *b'* of a link cannot be disengaged from the hook-like device *c*, except by a lateral movement of the two devices relatively, while thus positioned, and that therefore, even in handling the chain when not in use, it is not liable to separate at the articulations and fall to pieces.

So far as the main object of my invention may be concerned, and in carrying out the first part of said invention, it is, of course, immaterial whether the chain be made of the precise form shown in the drawings or according to the form of some other of the several species of chain to which my said invention is equally applicable.

A drive-chain made according to my invention will possess, in addition to all the desirable features of analogous chains as made prior thereto, the advantages due to its described capacity for a ready uncoupling and reunion of its parts at any of the points of articulation for any of the known and desirable purposes hereinbefore alluded to, and at the same time may be made as strong and durable as, and cheaper than, prior drive-chains of a similar form, but lacking the feature of detachability peculiar to my invention.

Having so fully explained the nature of my invention that those skilled in the art can practice the same, and having stated the best modes known to me of carrying out my invention, what I claim as new, and desire to secure by Letters Patent, is—

1. A drive-chain, the parts of which are so connected, by means of open sockets or hook-like couplers partially surrounding the end bars of the links, that when the parts of the chain are in a working position such parts are inseparable and capable of only a hinge-like relative motion, but when brought into an unusual relative position any two of such parts may be designedly uncoupled by the removal of the end bar of one part from the socket or hook-like coupler of another part.

2. As an improved manufacture, a drive-chain link having an open socket or hook-like coupling device at one end and an end bar at the other end, the structure of the link being such that a union of two or more such links will constitute a drive-chain, the parts of which, while they are not liable to accidental separation, may be designedly uncoupled by the removal of the end bar of one link from the socket of another link, substantially as set forth.

In testimony whereof I have hereunto set my hand and seal this 18th day of April, 1879.

W. D. EWART. [L. S.]

In presence of—

CHAS. L. SPENCER,
ALEX T. REID.